(12) United States Patent
Caldwell et al.

(10) Patent No.: US 10,937,320 B2
(45) Date of Patent: *Mar. 2, 2021

(54) DRIVE ENVELOPE DETERMINATION

(71) Applicant: Zoox, Inc., Foster City, CA (US)

(72) Inventors: Timothy Caldwell, Mountain View, CA (US); Dan Xie, Santa Clara, CA (US); William Anthony Silva, San Francisco, CA (US); Abishek Krishna Akella, Pleasanton, CA (US); Jefferson Bradfield Packer, San Francisco, CA (US); Rick Zhang, San Mateo, CA (US); Marin Kobilarov, Mountain View, CA (US)

(73) Assignee: Zoox, Inc., Foster City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/832,940

(22) Filed: Mar. 27, 2020

(65) Prior Publication Data
US 2020/0226931 A1 Jul. 16, 2020

Related U.S. Application Data

(63) Continuation of application No. 15/982,694, filed on May 17, 2018, now Pat. No. 10,614,717.

(51) Int. Cl.
*G08G 1/16* (2006.01)
*G08G 1/01* (2006.01)
(52) U.S. Cl.
CPC ........... *G08G 1/166* (2013.01); *G08G 1/0112* (2013.01); *G08G 1/167* (2013.01)

(58) Field of Classification Search
CPC ...... G08G 1/0112; G08G 1/166; G08G 1/167; B60W 2552/50; B60W 2554/20;
(Continued)

(56) References Cited

U.S. PATENT DOCUMENTS 6,332,105 B1 * 12/2001 Calise .................. G05B 13/027
244/195
8,473,144 B1 6/2013 Dolgov et al.
(Continued)

FOREIGN PATENT DOCUMENTS

DE 102010012954 9/2011

OTHER PUBLICATIONS

Non-Final Office Action dated Oct. 2, 2019 for U.S. Appl. No. 15/982,694 "Drive Envelope Determination" Caldwell, 26 pages.
(Continued)

*Primary Examiner* — Babar Sarwar
(74) *Attorney, Agent, or Firm* — Lee & Hayes, P.C.

(57) ABSTRACT

Drive envelope determination is described. In an example, a vehicle can capture sensor data while traversing an environment and can provide the sensor data to computing system(s). The sensor data can indicate agent(s) in the environment and the computing system(s) can determine, based on the sensor data, a planned path through the environment relative to the agent(s). The computing system(s) can also determine lateral distance(s) to the agent(s) from the planned path. In an example, the computing system(s) can determine modified distance(s) based at least in part on the lateral distance(s) and information about the agents. The computing system can determine a drive envelope based on the modified distance(s) and can determine a trajectory in the drive envelope.

20 Claims, 4 Drawing Sheets

(58) Field of Classification Search
CPC ........... B60W 2554/402; B60W 30/09; B60W 30/095; B60W 30/0956; B60W 30/10
See application file for complete search history.

(56) References Cited

U.S. PATENT DOCUMENTS

| | | | | |
|---|---|---|---|---|
| 8,634,980 | B1* | 1/2014 | Urmson | B60T 17/221 |
| | | | | 701/23 |
| 9,889,798 | B1* | 2/2018 | Cong | B60Q 9/008 |
| 2005/0043879 | A1* | 2/2005 | Desens | B60K 31/0008 |
| | | | | 701/96 |
| 2005/0216172 | A1* | 9/2005 | Schroder | G08G 1/166 |
| | | | | 701/96 |
| 2005/0267683 | A1* | 12/2005 | Fujiwara | G01S 13/931 |
| | | | | 701/301 |
| 2007/0145818 | A1* | 6/2007 | Kobayashi | G08G 1/161 |
| | | | | 303/113.4 |
| 2009/0326752 | A1* | 12/2009 | Staempfle | G08G 1/167 |
| | | | | 701/31.4 |
| 2009/0326819 | A1* | 12/2009 | Taguchi | B60W 40/04 |
| | | | | 701/301 |
| 2009/0326820 | A1* | 12/2009 | Shimizu | B60T 7/22 |
| | | | | 701/301 |
| 2011/0057813 | A1* | 3/2011 | Toledo | B60T 7/22 |
| | | | | 340/932.2 |
| 2011/0121994 | A1* | 5/2011 | Pampus | B62D 15/027 |
| | | | | 340/932.2 |
| 2012/0265431 | A1* | 10/2012 | Hayakawa | B60T 7/22 |
| | | | | 701/301 |
| 2015/0154861 | A1* | 6/2015 | Hillenbrand | G08G 1/0145 |
| | | | | 701/2 |
| 2016/0288831 | A1* | 10/2016 | Lee | B62D 6/00 |
| 2017/0036601 | A1* | 2/2017 | Kimura | B60R 1/00 |
| 2017/0057498 | A1* | 3/2017 | Katoh | B60W 10/18 |
| 2017/0166254 | A1* | 6/2017 | Katoh | B62D 6/00 |
| 2017/0197627 | A1* | 7/2017 | Wieneke | G05D 1/0088 |
| 2017/0200371 | A1* | 7/2017 | Glander | G05D 1/021 |
| 2017/0225619 | A1* | 8/2017 | Torii | B60R 1/00 |
| 2017/0236422 | A1* | 8/2017 | Naka | B60W 30/12 |
| | | | | 701/301 |
| 2017/0327118 | A1* | 11/2017 | Masui | B60W 40/072 |
| 2018/0001894 | A1* | 1/2018 | Masui | B60W 30/16 |
| 2018/0029602 | A1* | 2/2018 | Altendorfer | B60W 40/04 |
| 2018/0046191 | A1* | 2/2018 | Keller | G06T 7/251 |
| 2018/0056997 | A1* | 3/2018 | Ohmura | B60W 40/04 |
| 2018/0059670 | A1 | 3/2018 | Nilsson | |
| 2018/0065627 | A1* | 3/2018 | Ohmura | B60W 30/09 |
| 2018/0113450 | A1* | 4/2018 | Sherony | G08G 1/167 |
| 2018/0120859 | A1* | 5/2018 | Eagelberg | G05D 1/0088 |
| 2019/0171218 | A1* | 6/2019 | Hammond | G05D 1/0214 |
| 2019/0355257 | A1 | 11/2019 | Caldwell et al. | |

OTHER PUBLICATIONS

The PCT Search Report and Written Opinion dated Sep. 24, 2019 for PCT Application No. PCT/US2019/032401, 14 pages.

* cited by examiner

DRIVE ENVELOPE DETERMINATION

RELATED APPLICATION

This application is a continuation of, and claims priority to, U.S. patent application Ser. No. 15/982,694, filed on May 17, 2018, which is incorporated in its entirety by reference herein.

BACKGROUND

Planning systems utilize information associated with agents in an environment to determine actions relative to agents. For example, some existing planning systems consider distances and actions of agents to determine a drive path through an environment. However, conventional models have resulted in discrete consideration of individual agents, often making travel more segmented. For example, conventional systems may not consider multiple agents when determining an action or reaction while travelling in an environment, thereby leading to less than optimal efficiency and/or passenger comfort and satisfaction.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
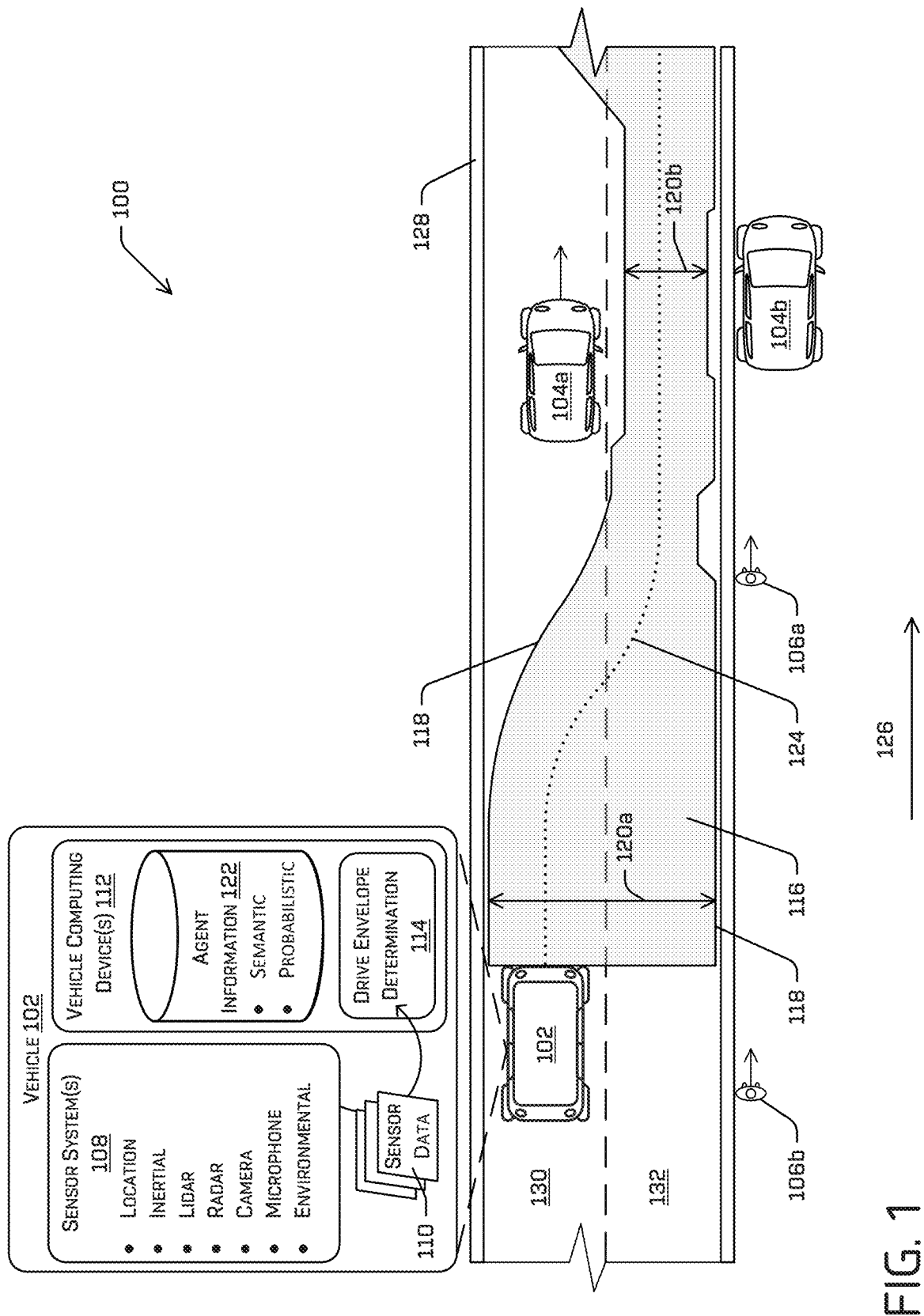
FIG. 1 is a schematic diagram illustrating an example implementation of generating a drive envelope in an environment as described herein.

Techniques described herein are directed to determining a drive envelope in which a vehicle can travel in an environment. For example, in implementations described herein, the drive envelope may be constructed by considering a plurality of different agents (e.g., dynamic obstacles in an environment, including but not limited to pedestrians, animals, cyclists, trucks, motorcycles, other vehicles, or the like, static obstacles in the environment, including but not limited to road signs, curbs, road markings, physical lane boundaries, or the like, and/or other obstacles, which may be known or unknown) in an environment of a vehicle and/or the predicted actions of those agents. In at least one example, the drive envelope is a virtual representation in the environment that generally defines the constraints and/or boundaries within which a vehicle can safely travel relative to the agents to effectively reach an intended destination. In some examples, the drive envelope is determined by computing device(s) on an autonomous vehicle, and can be utilized by those computing device(s) to navigate the autonomous vehicle in the environment. That is, the computing device(s) onboard the autonomous vehicle can determine trajectories and/or drive paths based on the extents of the drive envelope.

As a non-limiting example, a computing device of an autonomous vehicle may receive sensor data and determine one or more objects in an environment and/or attributes of the one or more objects in the environment. In some instances, the autonomous vehicle can utilize the object(s) and/or the attributes of the object(s) to determine which object(s) should be included in a drive envelope, to determine extents of the drive envelope, and/or to determine a trajectory to navigate the autonomous vehicle in the drive envelope.

In some implementations, the drive envelope may be determined by fusing or including data about a number of agents in the environment. For example, a predicted path that navigates through the environment relative to agents may be determined. At discrete points (or line segments at discrete points) along the path, lateral distances from the path to the agents may then be determined. For example, ray casting techniques may be used to determine the lateral distances at poses of a vehicle along the planned path. Based on these distances and information about the agent(s), adjusted distances may then be determined. For example, semantic information about the agents may be used to classify the agents and determine a safety factor or safety level associated therewith. In some instances, a minimum offset distance of the vehicle from an agent, or a safety margin, may be associated with each safety level. Probabilistic information about the agents also may be used to determine the safety level and/or the offset distance of the vehicle relative to the agent. For instance, probabilistic filtering may be applied to the distance determinations, e.g., to account for uncertainty associated with the lateral distances. For example, uncertainty may be associated with the measurements, e.g., with calibration and/or tolerances of sensors and/or sensor components, with motion of the sensed agents, e.g., uncertainty associated with potential future movement of agents or prediction models that characterize the movement, or the like.

In some examples, once the drive envelope is established, the computing device of the autonomous vehicle may determine one or more trajectories for proceeding within the drive envelope. Thus, for example, the drive envelope may define boundaries of a region in which the vehicle may travel, and the trajectories may be discrete segments within the drive envelope according to which the vehicle will travel. Thus, for example, while the drive envelope may be calculated using a planned or predicted path through the environment, the trajectories may be discrete, shorter segments intended to be carried out by the vehicle to traverse through the environment, within the drive envelope.

Techniques described herein are directed to leveraging sensor and perception data to enable a vehicle, such as an autonomous vehicle, to navigate through an environment while circumventing agents in the environment. Techniques described herein can utilize semantic and/or probabilistic information to determine a drive envelope within which a vehicle can travel relative to those agents in a more efficient manner than with existing navigation techniques. For example, techniques described herein may be faster than conventional techniques, as they may encode large amounts of complex environmental data into a single representation for efficient optimization. That is, techniques described herein provide a technological improvement over existing prediction and navigation technology. In addition to improving the accuracy with which sensor data can be used to determine the drive envelope, techniques described herein can provide a smoother ride and improve safety outcomes by, for example, more accurately determining a safe region in which the vehicle may operate to reach an intended destination.

FIGS. 1-4 provide additional details associated with techniques described herein.

FIG. 1 is a schematic diagram illustrating an example implementation of determining a drive envelope for travelling through an environment as described herein. More specifically, FIG. 1 illustrates an example environment 100 in which a vehicle 102 is positioned. In the illustrated example, the vehicle 102 is driving in the environment 100, although in other examples the vehicle 102 may be stationary and/or parked in the environment 100. One or more objects, or agents, also are in the environment 100. For instance, FIG. 1 illustrates additional vehicles 104a, 104b and pedestrians 106a, 106b in the environment 100. Of course, any number and/or type of agents can additionally or alternatively be present in the environment 100.

For the purpose of illustration, the vehicle 102 can be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such an example, since the vehicle 102 can be configured to control all functions from start to stop, including all parking functions, it can be unoccupied. This is merely an example, and the systems and methods described herein can be incorporated into any ground-borne, airborne, or waterborne vehicle, including those ranging from vehicles that need to be manually controlled by a driver at all times, to those that are partially or fully autonomously controlled. Additional details associated with the vehicle 102 are described below.

In the example of FIG. 1, the vehicle 102 can be associated with one or more sensor systems 108. The sensor system(s) 108 can generate sensor data 110, which can be utilized by vehicle computing device(s) 112 associated with the vehicle 102 to recognize the one or more agents, e.g., the vehicles 104 and the pedestrians 106. The sensor system(s) 108 can include, but is/are not limited to, light detection and ranging (LIDAR) sensors, radio detection and ranging (RADAR) sensors, ultrasonic transducers, sound navigation and ranging (SONAR) sensors, location sensors (e.g., global positioning system (GPS), compass, etc.), inertial sensors (e.g., inertial measurement units, accelerometers, magnetometers, gyroscopes, etc.), cameras (e.g., RGB, IR, intensity, depth, etc.), wheel encoders, microphones, environment sensors (e.g., temperature sensors, humidity sensors, light sensors, pressure sensors, etc.), etc.

In at least one example, the vehicle computing device(s) 112 can include a perception system, which can perform agent detection, segmentation, and/or classification based at least in part on the sensor data 110 received from the sensor system(s) 108. For instance, the perception system can detect the vehicles 104a, 104b and/or the pedestrians 106a, 106b in the environment 100 based on the sensor data 110 generated by the sensor system(s) 108. Additionally, the perception system can determine an extent of the vehicles 104a, 104b and/or the pedestrians 106a, 106b (e.g., height, weight, length, etc.), a pose of the vehicles 104a, 104b and/or the pedestrians 106a, 106b (e.g., x-coordinate, y-coordinate, z-coordinate, pitch, roll, yaw), etc. The sensor system(s) 108 can continuously generate the sensor data 110 (e.g., in near-real time), which can be utilized by the perception system (and other systems of the vehicle computing device(s) 112).

The vehicle computing device(s) 112 can also include a drive envelope determination system 114, which, as described further herein, can determine a drive envelope 116. The drive envelope 116 may be a virtual area in the environment 100 in which the vehicle 102 can travel safely through the environment 100, e.g., relative to agents including the vehicles 104a, 104b and the pedestrians 106a, 106b. As illustrated in FIG. 1 and detailed further herein, the drive envelope 116 may be defined by virtual boundaries 118. In the example drive envelope 116 illustrated in FIG. 1, the drive envelope 116 may have a variable envelope width 120, e.g., in the width or lateral direction of the vehicle 102. (FIG. 1 illustrates a first envelope width 120a and a second envelope width 120b, which collectively, and along with other widths at other positions in the drive envelope 116, may be referred to as the envelope width 120.) As described herein, attributes of the virtual boundaries 118, including the envelope width 120, may be determined based at least in part on the sensor data 110 and/or determinations made by the perception system. For example, in some implementations, the virtual boundaries 118 may be determined based on agent information 122, which may include information about semantic classifications and/or probabilistic models. In at least some examples, virtual boundaries 118 may be encoded with information (such as lateral distance to the nearest agent, semantic classification of the nearest agent, etc.).

As also illustrated in FIG. 1, upon determining the drive envelope 118, the vehicle computing device(s) 112 also may determine a travel path 124 along which the vehicle 102 may travel through the environment 100. The planner system can determine routes and/or trajectories to use to control the vehicle 102 based at least in part on the sensor data 110 received from the sensor system(s) 108 and/or any determinations made by the perception system. For instance, the planning system can determine routes to navigate safely through the environment relative to the vehicle 104a, 104b and the pedestrians 106a, 106b.

More specifically, FIG. 1 illustrates a scenario in which the vehicle 102 is travelling through the environment 100, generally in the direction of arrow 126. The vehicle 102 is travelling on a road 128 having a first lane 130 and a second lane 132. The vehicle 102 is in the second lane 130, behind the vehicle 104a, and, in the example, is travelling relatively faster than the vehicle 104a. For example, the vehicle 104a may be slowing down to turn left, to parallel park on the left side of the road 126, to drop off a passenger or delivery on the left shoulder of the road, or the like. In examples of this disclosure, the vehicle 102, e.g., by executing the drive envelope determination system 114, may determine the drive envelope 116 as a precursor to determining whether the vehicle 102 can safely navigate around the slowing vehicle 104a. More specifically, the vehicle computing device(s) 112, using the sensor data 110 and/or the object information 122, may determine information about agents in the environment 100, which may include the vehicle 104a, the vehicle 104b, the pedestrian 106a, the pedestrian 106b, and/or additional agents. For example, and as will be described further herein, the vehicle computing device(s) 112, using the drive envelope determination system 114, may fuse or combine information about each of the agents, including the object information 122, to configure the drive envelope 116. Such a drive envelope 116 may, in turn, be used to determine one or more trajectories (e.g. by providing constrains and/or boundaries) along which vehicle 102 may travel.

With further reference to FIG. 1, the drive envelope 116 may have varying widths, e.g., the first width 120a and a second width 120b, and those widths are determined at least in part based on the object information 122. For example, at a position immediately in front of the vehicle 102 in the direction illustrated by arrow 126, the width 120a generally spans the entire width of the road 126. At edges of the first lane 128 and the second lane 130, a slight offset relative to the shoulder may be provided, although such an offset may be excluded in other embodiments. Further along the road 126 in the direction of the arrow 124, the drive envelope 116 begins to narrow as the boundary 118 gradually moves away from the left shoulder until the drive envelope 116 is completely confined in the right lane 130. This narrowing of the drive envelope 116 is a result of the presence and/or the relative deceleration of the vehicle 104a. Moreover, immediately adjacent the vehicle 104a, the drive envelope 116 may further narrow, e.g., to provide a minimum lateral offset relative to the vehicle 104a. Similarly, on the right side of the drive envelope 116, offsets may be provided proximate the first pedestrian 106a and the vehicle 104b, which is parked on the right shoulder of the road 126. In some examples, such a drive envelope 116 may also be determined based on a predicted trajectory of agents, such as that of pedestrian 106a. As a non-limiting example depicted in FIG. 1, the drive envelope 116 indents slightly near the pedestrian 106a in anticipation of the pedestrian 106a continuing walking in the direction of travel 126. The length of such an indent may be based on, for example, the velocities of the vehicle 102 and the pedestrian 106a.

As described further herein, the width 120 of the drive envelope 116 varies as a result of information about agents in the environment. Thus, for example, offsets are provided proximate the vehicle 104a, the vehicle 104b, and the pedestrian 106a. These offsets may serve to provide a safety margin or minimum distance of the vehicle 102 from the objects, as the vehicle 102 travels in the drive envelope 116. In some implementations, the offsets and/or the minimum distances may differ among and between agents in the environment 100. For example, semantic information about the agents may be used to determine appropriate offsets. Thus, in FIG. 1, pedestrians may be associated with a first classification and vehicles may be associated with a second classification. The first classification may correspond to a minimum offset larger than a minimum offset to which the second classification corresponds. Moreover, vehicles within the second classification may be further classified as static, as in the case of the vehicle 104b or dynamic, as in the case of the vehicle 104a. An offset relative to the moving vehicle 104a may be greater than the offset associated with the parked vehicle 104b, for example. In further examples, probabilistic information about the agents may also or alternatively be used to determine the offsets. For example, there may be some uncertainty associated with the actions of the moving pedestrian 106a and/or the moving vehicle 104a, e.g., because the pedestrian 106a or the driver of the vehicle 104a may change course. Probabilistic information may also be used to account for sensor inaccuracies, e.g., associated with the sensor system(s) 108.

The drive envelope 116 may allow for more efficient navigation around the vehicle 104a when compared with conventional navigation techniques. In conventional solutions, for example, the vehicle 102 may slow down as it approaches the vehicle 104a, e.g., to maintain a minimum distance between the vehicle 102 and the vehicle 104a, and only upon stopping or slowing to a threshold speed may the vehicle 102 begin to seek out an alternative route around the vehicle 104a. Alternatively, the vehicle 102 may idle in the lane 130 until the vehicle 104a turns, parks, moves, accelerates, or the like. However, in implementations of this disclosure, the drive envelope 116 considers multiple agents, as well as the object information 122, to provide a more robust understanding of the environment 100. This understanding may enhance decision making and/or allow for more effective and efficient control of the vehicle 102 as it travels through the environment 100. With specific regard to FIG. 1, such enhanced decision-making may allow the vehicle to traverse along the drive path 124, without the need to slow down behind the vehicle 104a and/or await additional decision making. Further, the drive envelope 116 provides boundaries for a wide range of possible trajectories which may be employed to safely navigate a portion of a path. By providing such a wide range of safe trajectories, the vehicle 102 is able to quickly overcome any hazards, while incorporating information about all agents in a scene.

FIG. 1 illustrates a single example of using a drive envelope to navigate in an environment. Myriad other examples also are contemplated. For example, the drive envelope may be used in any environment to better navigate agents.

Figure 2:
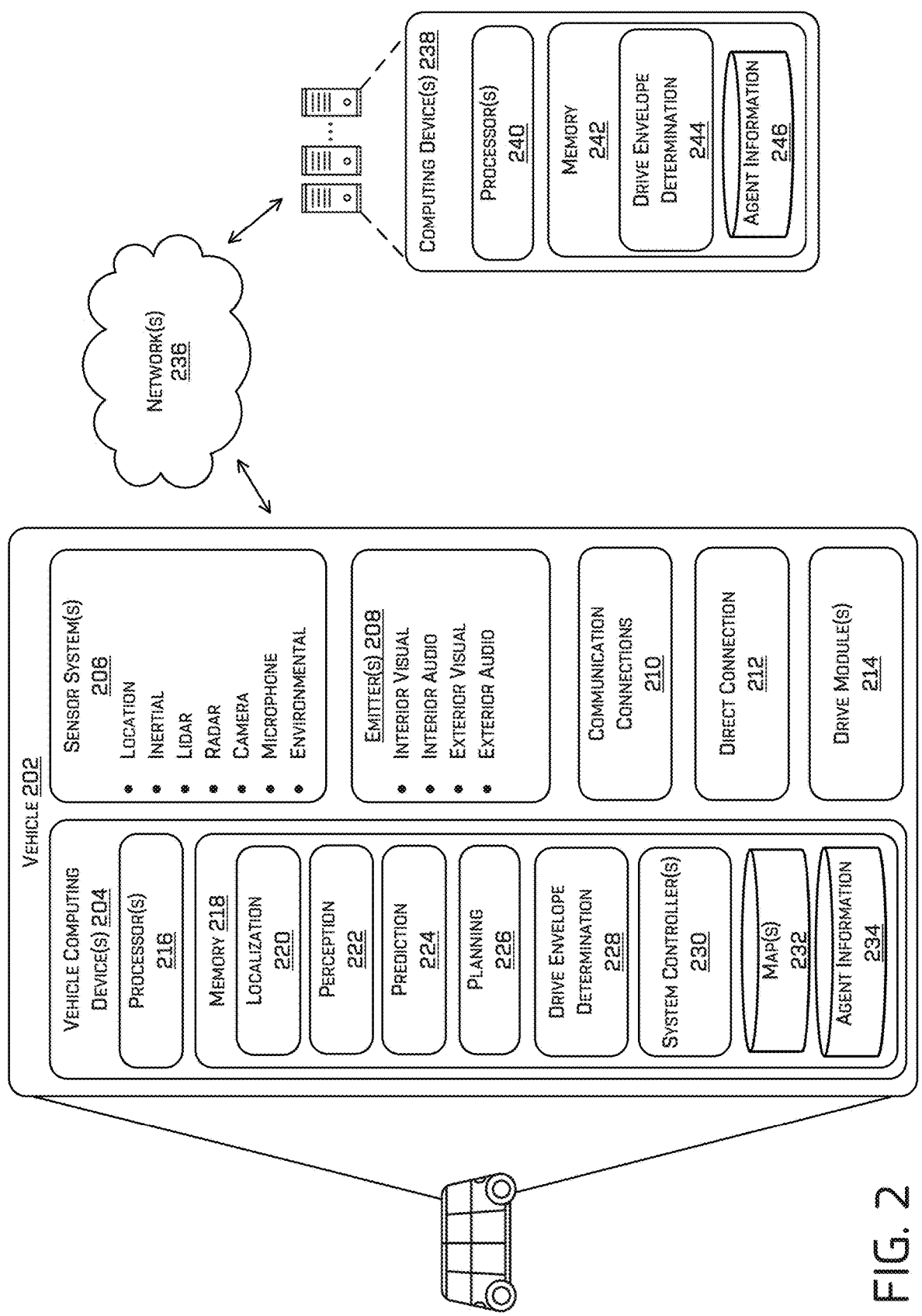
FIG. 2 is a block diagram illustrating an example computing system for generating a drive envelope as described herein.

FIG. 2 is a block diagram illustrating an example system 200 for generating and utilizing a drive envelope as described herein. In at least one example, the system 200 can include a vehicle 202, which can be the same vehicle as the vehicle 102 described above with reference to FIG. 1. The vehicle 202 can include one or more vehicle computing devices 204, one or more sensor systems 206, one or more emitters 208, one or more communication connections 210, at least one direct connection 212, and one or more drive modules 214. In at least one example, the sensor system(s) 206 can correspond to the sensor system(s) 108 described above with reference to FIG. 1. Further, in at least one example, the vehicle computing device(s) 204 can correspond to the vehicle computing device(s) 112 described above with reference to FIG. 1.

The vehicle computing device(s) 204 can include processor(s) 216 and memory 218 communicatively coupled with the processor(s) 216. In the illustrated example, the vehicle 202 is an autonomous vehicle; however, the vehicle 202 could be any other type of vehicle. In the illustrated example, the memory 218 of the vehicle computing device(s) 204 stores a localization system 220, a perception system 222, a prediction system 224, a planning system 226, a drive envelope determination system 228, and one or more system controllers 230. Although these systems and components are illustrated, and will be described below, as separate components for ease of understanding, functionality of the various systems and controllers may be attributed differently than discussed. By way of non-limiting example, functionality attributed to the perception system 224 may be carried out by the localization system 220 and/or the prediction system 224. Moreover, fewer or more systems and components may be utilized to perform the various functionalities described herein. Furthermore, though depicted in FIG. 2 as residing in memory 218 for illustrative purposes, it is contemplated that the localization system 220, the perception component 222, the prediction system 224, the planning system 226, the drive envelope determination component 228, and/or the one or more system controllers 230 can additionally, or alternatively, be accessible to the vehicle 202 (e.g., stored on, or otherwise accessible by, memory remote from the vehicle 202).

As also illustrated in FIG. 2, the memory 218 can include a map storage 232, which may store one or more maps, and/or agent information storage 232, which may store the agent information 122. A map can be any number of data structures modeled in two dimensions or three dimensions that are capable of providing information about an environment, such as, but not limited to, topologies (such as intersections), streets, mountain ranges, roads, terrain, and the environment in general. As discussed further herein, the agent information 122 may be any information about agents, including, without limitation, information that is useful for interpreting sensor data to classify or otherwise understand agents in the environment.

In at least one example, the localization system 220 can include functionality to receive data from the sensor system(s) 206 to determine a position and/or orientation of the vehicle 202 (e.g., one or more of an x-, y-, z-position, roll, pitch, or yaw). For example, the localization system 220 can include and/or request/receive a map of an environment (e.g., from the map storage 232) and can continuously determine a location and/or orientation of the autonomous vehicle within the map. In some instances, the localization system 220 can utilize SLAM (simultaneous localization and mapping), CLAMS (calibration, localization and mapping, simultaneously), relative SLAM, bundle adjustment, non-linear least squares optimization, differential dynamic programming, or the like to receive image data, LIDAR data, radar data, IMU data, GPS data, wheel encoder data, and the like to accurately determine a location of the autonomous vehicle. In some instances, the localization system 220 can provide data to various components of the vehicle 202 to determine an initial position of an autonomous vehicle for generating a candidate trajectory for travelling in the environment.

In some instances, the perception system 222 can include functionality to perform object detection, segmentation, and/or classification. In some examples, the perception system 222 can provide processed sensor data that indicates a presence of an agent that is proximate to the vehicle 202, such as the vehicles 104a, 104b and/or the pedestrians 106a, 106b. The perception system may also include a classification of the entity as an entity type (e.g., car, pedestrian, cyclist, animal, building, tree, road surface, curb, sidewalk, unknown, etc.). For instance, the perception system 222 may compare sensor data to the agent information 120 in the agent information database 234 to determine the classification. In additional and/or alternative examples, the perception system 222 can provide processed sensor data that indicates one or more characteristics associated with a detected agent and/or the environment in which the agent is positioned. In some examples, characteristics associated with an agent can include, but are not limited to, an x-position (global and/or local position), a y-position (global and/or local position), a z-position (global and/or local position), an orientation (e.g., a roll, pitch, yaw), an agent type (e.g., a classification), a velocity of the agent, an acceleration of the agent, an extent of the agent (size), etc. Characteristics associated with the environment can include, but are not limited to, a presence of another agent in the environment, a state of another agent in the environment, a time of day, a day of a week, a season, a weather condition, an indication of darkness/light, etc.

The prediction system 224 can access sensor data from the sensor system(s) 206, map data from the map storage 232, and, in some examples, perception data output from the perception system 222 (e.g., processed sensor data). In at least one example, the prediction system 224 can determine features associated with the agent based at least in part on the sensor data, the map data, and/or the perception data. As described above, features can include an extent of an agent (e.g., height, weight, length, etc.), a pose of an agent (e.g., x-coordinate, y-coordinate, z-coordinate, pitch, roll, yaw), a velocity of an agent, an acceleration of an agent, and a direction of travel of an agent (e.g., a heading). Moreover, the prediction system 224 may be configured to determine a distance between an agent and a proximate driving lane, a width of a current driving lane, proximity to a crosswalk, semantic feature(s), interactive feature(s), etc.

The prediction system 224 can analyze features of agents to predict future actions of the agents. For instance, the prediction system 224 can predict lane changes, decelerations, accelerations, turns, changes of direction, or the like. The prediction system 224 can send prediction data to the drive envelope determination system 228 so that the drive envelope determination system 228 can utilize the prediction data to determine the boundaries of the drive envelope (e.g. based on one or more of an uncertainty in position, velocity, acceleration in addition to, or alternatively, with a semantic classification of the agent). For instance, if the prediction data indicates that a pedestrian walking along the shoulder is behaving erratically, the drive envelope determination system 228 can determine an increased offset of the drive envelope proximate the pedestrian. In some examples where the vehicle 202 is not autonomous, the prediction system 224 may provide an indication (e.g., an audio and/or visual alert) to a driver of a predicted event that may affect travel.

In general, the planning system 226 can determine a path for the vehicle 202 to follow to traverse through an environment. For example, the planning system 226 can determine various routes and trajectories and various levels of detail. For example, the planning system 226 can determine a route to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, the planning system 226 can generate an instruction for guiding the autonomous vehicle along at least a portion of the route from the first location to the second location. In at least one example, the planning system 226 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 202 to navigate. Thus, in example implementations described herein, the planning system 226 may generate trajectories along which the vehicle can navigate, with the trajectories being contained within the drive envelope.

The drive envelope determination system 228 is configured to determine a drive envelope, such as the drive envelope 116. Although illustrated as a separate block in the memory 218, in some examples and implementations, the drive envelope determination system 228 may be a part of the planning system 226. The drive envelope determination system 228 can access sensor data from the sensor system(s) 206, map data from the map storage 232, agent information from the agent information store 234, outputs from one or more of the localization system 220, the perception system 222, and/or the prediction system 224 (e.g., processed data). By way of non-limiting example, the drive envelope determination system 228 may access (e.g., retrieve or receive) one or more planned paths. The planned paths may represent potential paths to navigate the environment, and may be determined based on map data, agent information, and/or perception data, for example. In some examples, the planned paths may be determined as candidate paths for carrying out a mission. For instance, the vehicle computing device(s) 204, may define or determine a mission as a highest-level of navigation to a destination, e.g., a series of roads for navigating to the destination. Once the mission is determined, one or more actions for carrying out that high-level navigation may then be determined. Actions may include more frequent determinations of how to carry out the mission. For example, actions may include tasks such as "follow vehicle," "pass vehicle on the right," or the like. In some examples, the projected paths described herein may be determined for each action.

For the planned path(s), the drive envelope determination system 228 may determine, at discrete points along the planned path(s), lateral distances from the path to agents in the environment. For example, the distances may be received as perception data generated by the perception system 222, and/or may be determined using mathematical and/or computer vision models, such as ray casting techniques. Various lateral distances may then be adjusted to account for other factors. For example, it may be desirable to maintain a minimum distance between the vehicle 202 and agents in the environment. In implementations of this disclosure, information about the agents, including semantic classifications, may be used to determine those distance adjustments. Moreover, the prediction system 224 may also provide prediction data about a predicted movement of the agents, and the distances may further be adjusted based on those predictions. For example, the prediction data may include a confidence score and the lateral distance may be adjusted based on the confidence score, e.g., by making a greater adjustment for less confident predictions and slighter or no adjustments for more confident predictions. Using the adjusted distances, the drive envelope determination system 228 may define boundaries of the drive envelope. In at least some examples, the boundaries may be discretized (e.g. every 10 cm, 50 cm, 1 m, etc) and information regarding the boundary may be encoded (e.g. lateral distance to the nearest agent, semantic classification of the nearest agent, confidence and/or probability score associated with the boundary, etc.). As described herein, the trajectory determined by the planning system 224 may be confined by, and in accordance with, in the drive envelope. While the drive envelope determination system 228 is illustrated as being separate from the planning system 226, one or more of the functionalities of the drive envelope system 228 may be carried out by the planning system 226. In some embodiments, the drive envelope determination system 228 may be a part of the planning system 226.

In at least one example, the localization system 220, the perception system 222, the prediction system 224, the planning system 226, and/or the drive envelope determination system 228 can process sensor data, as described above, and can send their respective outputs over network(s) 236, to computing device(s) 238. In at least one example, the localization system 220, the perception system 222, the prediction system 224, and/or the planning system 226 can send their respective outputs to the computing device(s) 238 at a particular frequency, after a lapse of a predetermined period of time, in near real-time, etc.

In at least one example, the vehicle computing device(s) 204 can include one or more system controllers 230, which can be configured to control steering, propulsion, braking, safety, emitters, communication, and other systems of the vehicle 202. These system controller(s) 230 can communicate with and/or control corresponding systems of the drive module(s) 214 and/or other components of the vehicle 202. For example, the system controllers 230 may cause the vehicle to traverse along a drive path determined by the planning system 226, e.g., in the drive envelope 116 determined by the drive envelope determination system 228.

In at least one example, the sensor system(s) 206 can include LIDAR sensors, RADAR sensors, ultrasonic transducers, SONAR sensors, location sensors (e.g., GPS, compass, etc.), inertial sensors (e.g., inertial measurement units, accelerometers, magnetometers, gyroscopes, etc.), cameras (e.g., RGB, UV, IR, intensity, depth, etc.), microphones, wheel encoders, environment sensors (e.g., temperature sensors, humidity sensors, light sensors, pressure sensors, etc.), etc. The sensor system(s) 306 can include multiple instances of each of these or other types of sensors. For instance, the LIDAR sensors can include individual LIDAR sensors located at the corners, front, back, sides, and/or top of the vehicle 202. As another example, the camera sensors can include multiple cameras disposed at various locations about the exterior and/or interior of the vehicle 202. The sensor system(s) 206 can provide input to the vehicle computing device(s) 204. Additionally and/or alternatively, the sensor system(s) 306 can send sensor data, via the network(s) 236, to the computing device(s) 238 at a particular frequency, after a lapse of a predetermined period of time, in near real-time, etc.

The vehicle 202 can also include one or more emitters 208 for emitting light and/or sound. The emitter(s) 208 in this example include interior audio and visual emitters to communicate with passengers of the vehicle 202. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 208 in this example also include exterior emitters. By way of example and not limitation, the exterior emitters in this example include light emitters (e.g., indicator lights, signs, light arrays, etc.) to visually communicate with pedestrians, other drivers, other nearby vehicles, etc., one or more audio emitters (e.g., speakers, speaker arrays, horns, etc.) to audibly communicate with pedestrians, other drivers, other nearby vehicles, etc., etc. In at least one example, the emitter(s) 208 can be disposed at various locations about the exterior and/or interior of the vehicle 202.

The vehicle 202 can also include communication connection(s) 210 that enable communication between the vehicle 202 and other local or remote computing device(s). For instance, the communication connection(s) 210 can facilitate communication with other local computing device(s) on the vehicle 202 and/or the drive module(s) 214. Also, the communication connection(s) 310 can allow the vehicle to communicate with other nearby computing device(s) (e.g., other nearby vehicles, traffic signals, etc.). The communications connection(s) 210 also enable the vehicle 202 to communicate with a remote teleoperations computing device or other remote services.

The communications connection(s) 210 can include physical and/or logical interfaces for connecting the vehicle computing device(s) 204 to another computing device or a network, such as network(s) 232. For example, the communications connection(s) 210 can enable Wi-Fi-based communication such as via frequencies defined by the IEEE 802.11 standards, short range wireless frequencies such as BLUETOOTH®, or any suitable wired or wireless communications protocol that enables the respective computing device to interface with the other computing device(s).

In at least one example, the vehicle 202 can include drive module(s) 214. In some examples, the vehicle 202 can have a single drive module 214. In at least one example, if the vehicle 202 has multiple drive modules 214, individual drive modules 214 can be positioned on opposite ends of the vehicle 202 (e.g., the front and the rear, etc.). In at least one example, the drive module(s) 214 can include sensor system(s) to detect conditions of the drive module(s) 214 and/or the surroundings of the vehicle 202. By way of example and not limitation, the sensor system(s) 206 can include wheel encoder(s) (e.g., rotary encoders) to sense rotation of the wheels of the drive module, inertial sensors (e.g., inertial measurement units, accelerometers, gyroscopes, magnetometers, etc.) to measure position and acceleration of the drive module, cameras or other image sensors, ultrasonic sensors to acoustically detect objects in the surroundings of the drive module, LIDAR sensors, RADAR sensors, etc. Some sensors, such as the wheel encoder(s) can be unique to the drive module(s) 214. In some cases, the sensor system(s) on the drive module(s) 214 can overlap or supplement corresponding systems of the vehicle 202 (e.g., the sensor system(s) 206).

The drive module(s) 214 can include many of the vehicle systems, including a high voltage battery, a motor to propel the vehicle 202, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive module(s) 214 can include a drive module controller which can receive and preprocess data from the sensor system(s) and to control operation of the various vehicle systems. In some examples, the drive module controller can include processor(s) and memory communicatively coupled with the processor(s). The memory can store one or more modules to perform various functionalities of the drive module(s) 214. Furthermore, the drive module(s) 214 also include communication connection(s) that enable communication by the respective drive module with other local or remote computing device(s).

As described above, the vehicle 202 can send sensor data to the computing device(s) 238, via the network(s) 236. In some examples, the vehicle 202 can send raw sensor data to the computing device(s) 236. In other examples, the vehicle 202 can send processed sensor data and/or representations of sensor data to the computing device(s) 238 (e.g., data output from the localization system 220, the perception system 222, the prediction system 224, and/or the planning system 226). In some examples, the vehicle 202 can send sensor data to the computing device(s) 238 at a particular frequency, after a lapse of a predetermined period of time, in near real-time, etc.

The computing device(s) 238 can receive the sensor data (raw or processed) from the vehicle 202 and/or one or more other vehicles and/or data collection devices, and can determine a drive envelope based on the sensor data and other information. In at least one example, the computing device(s) 238 can include processor(s) 240 and memory 242 communicatively coupled with the processor(s) 240. In the illustrated example, the memory 242 of the computing device(s) 238 stores a drive envelope determination component 244 which can include object information storage 246, for example. In at least one example, the agent information storage 246 can correspond to the agent information storage 230 and/or the agent information storage 122.

The drive envelope determination component 244 may correspond to the drive envelope determination system 228 described above. For example, the drive envelope determination component 244 may process data to determine a drive envelope remote from the vehicle. For example, the drive envelope (or a preferred drive envelope from a plurality of drive envelopes) may be determined at the computing device(s) 238 and transferred back to the vehicle 202, e.g., via the networks 236. Moreover, the drive envelope determination component 244 can perform one or more operations as described above and ascribed to the localization system 220, the perception system 222, the prediction system 224, and/or the planning system 226. In at least one example, the drive envelope determination component 244 can analyze the sensor data to determine attributes of agents in the environment to (1) determine whether such agent(s) should be included in a drive envelope and (2) configure boundaries of the drive envelope. For example, the drive envelope determination component 244 may compare information about agents to classification information, e.g., stored in the agent information storage 246, to determine whether the agent will be impacted by the vehicle, whether the agent (or a predicted movement of the agent) will impact the vehicle, and/or the extent to which the agent should impact the drive envelope.

The drive envelope determination component 244 may also or alternatively consider features of agents to characterized the drive envelope. Features can include an extent of an agent (e.g., height, weight, length, etc.), a pose of an agent (e.g., x-coordinate, y-coordinate, z-coordinate, pitch, roll, yaw), a velocity of an agent, an acceleration of an agent, a direction of travel of an agent (e.g., a heading), a distance between an agent and a proximate driving lane, a semantic classification of the agent (car, pedestrian, bicyclist, etc.), a width of a current driving lane, proximity to a crosswalk, semantic feature(s), interactive feature(s), etc. In some examples, at least some of the features (e.g., the extent, the pose, etc.) can be determined by a perception system onboard a sensor data source (e.g., the vehicle 202 and/or the other vehicle(s) and/or data collection device(s)) and other of the features can be determined based on such features and/or other sensor data and/or map data associated with a map of the environment. In some examples, a sample can be broken into one or more shorter periods of time and features can be determined for each of the shorter periods of time. The features for the sample can be determined based on a totality of features from each of the shorter periods of time.

The processor(s) 216 of the vehicle 202 and the processor(s) 240 of the computing device(s) 236 can be any suitable processor capable of executing instructions to process data and perform operations as described herein. By way of example and not limitation, the processor(s) 216 and 236 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 218 and 242 are examples of non-transitory computer-readable media. Memory 218 and 242 can store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 2 is illustrated as a distributed system, in alternative examples, components of the vehicle 202 can be associated with the computing device(s) 236 and/or components of the computing device(s) 236 can be associated with the vehicle 202. That is, the vehicle 202 can perform one or more of the functions associated with the computing device(s) 236, and vice versa. Moreover, although various systems and components are illustrated as being discrete systems, the illustrations are examples only, and more or fewer discrete systems may perform the various functions described herein.

Figure 3:
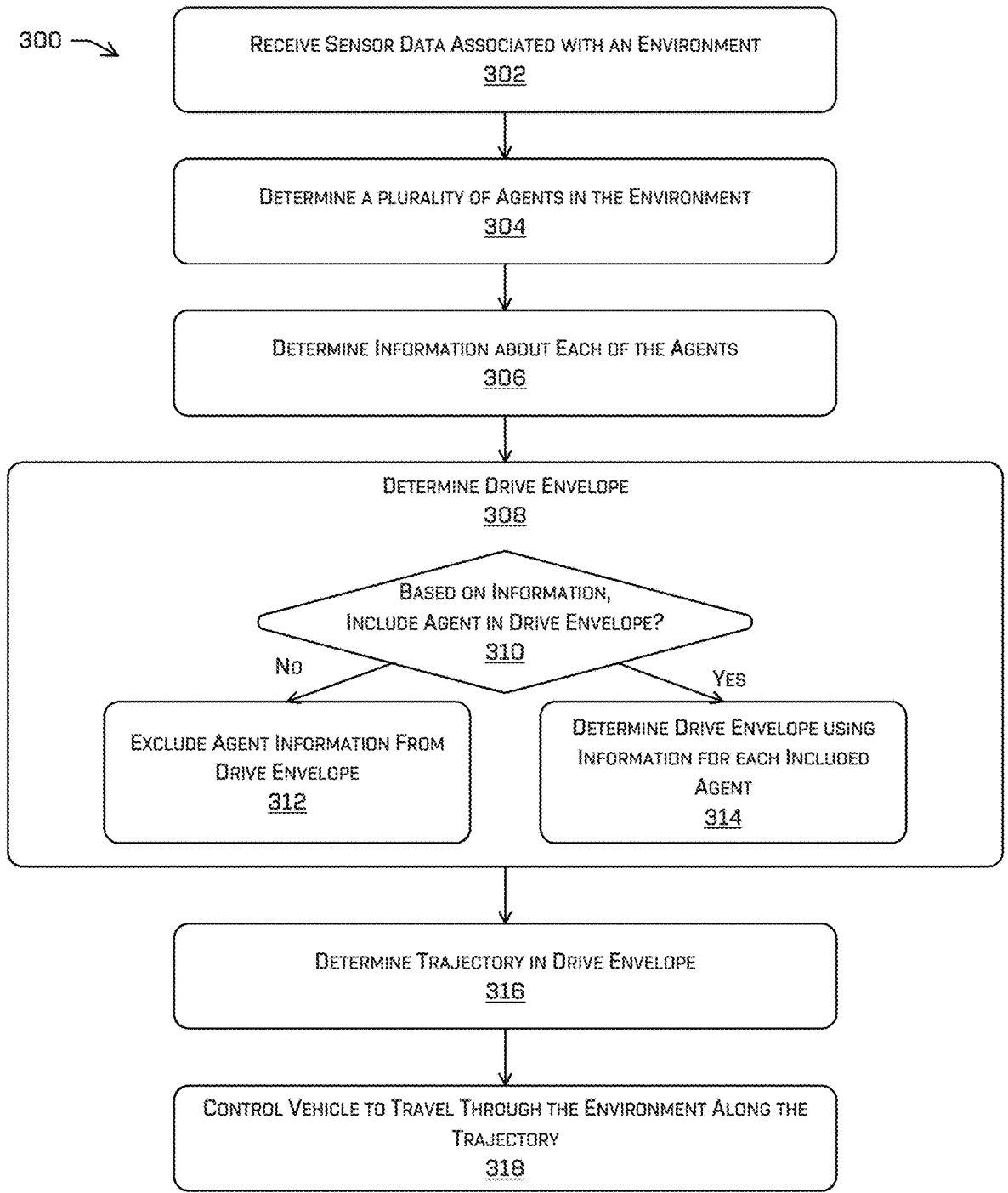
FIG. 3 is a flowchart illustrating an example method for navigating a vehicle through an environment, as described herein.
Figure 4:
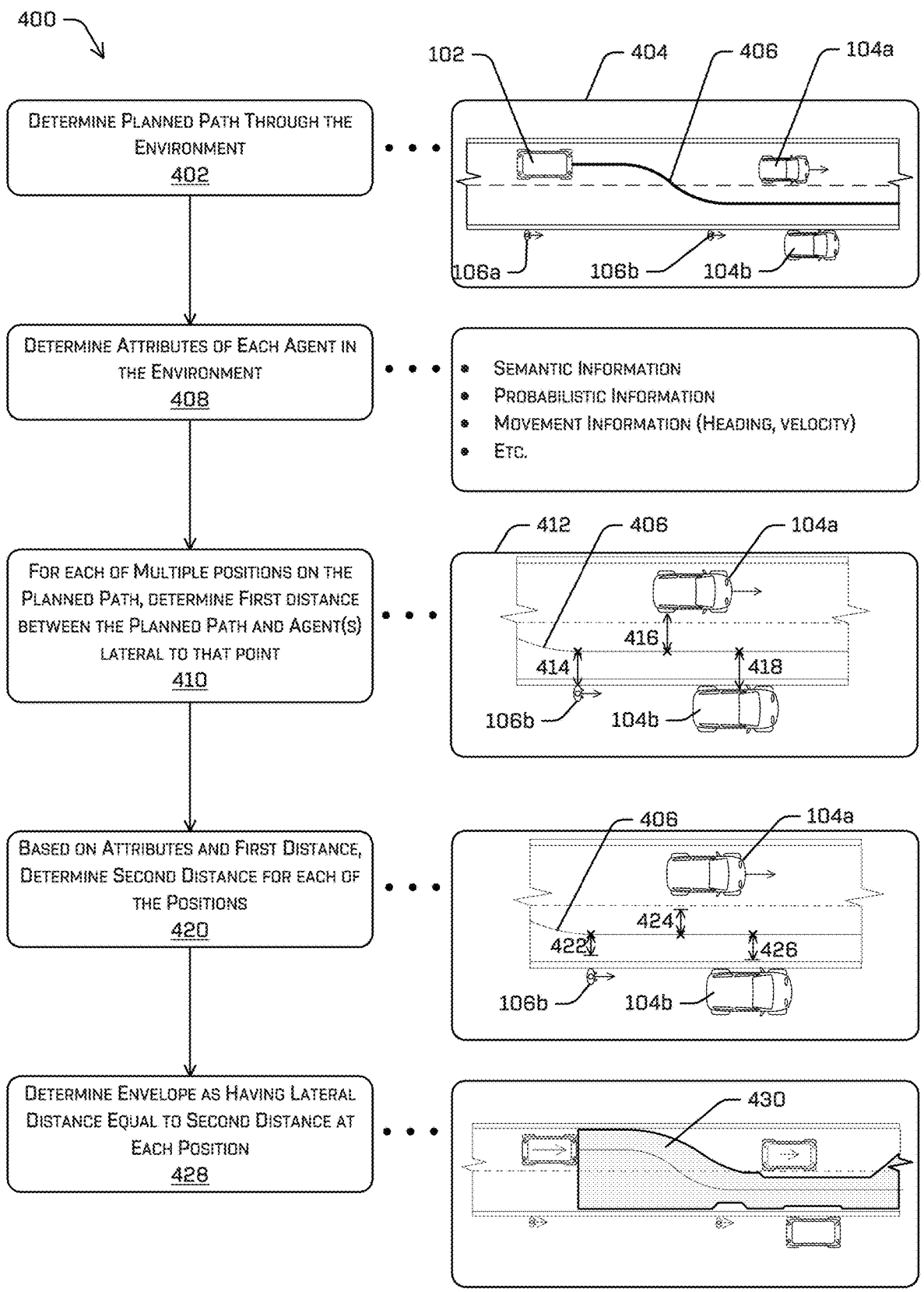
FIG. 4 includes textual and visual flowcharts to illustrate an example method for generating a drive envelope in an environment

FIGS. 3 and 4 are flowcharts showing example methods involving drive envelope determination as described herein. Specifically, FIG. 3 illustrates a method 300 in which objects in the environment are used to create a drive envelope and the drive envelope is used to determine a trajectory through the environment, e.g., so the vehicle can travel through the environment along the trajectory. FIG. 4 illustrates a method 400 that describes and illustrates drive envelope determination in more detail. The methods illustrated in FIGS. 3 and 4 are described with reference to the vehicles 102 and/or 202 shown in FIGS. 1 and 2 for convenience and ease of understanding. However, the methods illustrated in FIGS. 3 and 4 are not limited to being performed using the vehicles 102, 202, and can be implemented using any of the other vehicles described in this application, as well as vehicles other than those described herein. Moreover, the vehicles 102, 202 described herein are not limited to performing the methods illustrated in FIGS. 3 and 4.

The methods 300, 400 are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the methods 300, 400 can be combined in whole or in part with each other or with other methods.

FIG. 3 is a flowchart illustrating an example method 300 for traversing in an environment using a drive envelope, as described herein.

Block 302 illustrates receiving sensor data associated with an environment. As described above, a vehicle 202 can include sensor system(s) 206. In at least one example, the sensor system(s) 206 can include LIDAR sensors, RADAR sensors, ultrasonic transducers, SONAR sensors, location sensors (e.g., GPS, compass, etc.), inertial sensors (e.g., inertial measurement units, accelerometers, magnetometers, gyroscopes, etc.), cameras (e.g., RGB, IR, intensity, depth, etc.), microphones, wheel encoders, environment sensors (e.g., temperature sensors, humidity sensors, light sensors, pressure sensors, etc.), etc. The sensor system(s) 206 can provide input to the vehicle computing device(s) 204, and one or more systems of the vehicle computing device(s) 204 can utilize the input. For instance, in at least one example, the vehicle computing device(s) 204 can receive the input for processing by the localization system 220, the perception system 222, the prediction system 224, the planning system 226, and/or the drive envelope determination system 228.

As described above, in at least one example, the vehicle 202 can send sensor data to the computing device(s) 238, via the network(s) 236. In some examples, the vehicle 202 can send raw sensor data to the computing device(s) 238. In other examples, the vehicle 202 can send processed sensor data and/or representations of sensor data to the computing device(s) 238 (e.g., data output from the localization system 220, the perception system 222, the prediction system 224, and/or the planning system 226). In some examples, the vehicle 202 can send sensor data to the computing device(s) 238 at a particular frequency, after a lapse of a predetermined period of time, in near real-time, etc. Sensor data collected over time can correspond to log data.

Block 304 illustrates determining a plurality of objects in the environment. For example, as described above, a number of agents may be present in an environment in which an autonomous vehicle is travelling. In FIG. 1, the agents may include the vehicles 104a, 104b and the pedestrians 106a, 106b. Based on the sensor data received at block 302, the vehicle computing devices 204 may, e.g., via image processing, vision detection, classification and/or segmentation, LIDAR detection, segmentation, and/or classification, and/or other processes, recognize the agents. In addition to the example agents discussed herein, block 304 may also determine additional details about the environment and/or features in the environment.

Block 306 illustrates determining information about each of the objects. For example, the information about each of the objects may include physical features associated with the objects, including but not limited to an extent of an object (e.g., height, weight, length, etc.), a pose of the object (e.g., x-coordinate, y-coordinate, z-coordinate, pitch, roll, yaw), a velocity of the object, acceleration of the object, a direction of travel of the object (e.g., heading), a semantic classification, etc., as described above. Additionally or alternatively, such features can include an orientation relative to a sensor (e.g., which direction is a pedestrian facing), distance to a map feature (e.g., a start of a crosswalk, an end of a crosswalk, a side of a crosswalk, a start of a junction, an end of a junction, a side of a junction, etc.), semantic features (e.g., crosswalk sign, traffic lights, etc.), feasibility of performing an intent (e.g., cross-ability of a crosswalk, etc.), etc. In some examples, data from one or more of the localization system, the planner system, the prediction system, and/or the perception system may be used at block 306 to determine the features. The features may also include a predicted trajectory of the agent(s) and/or course of action. In at least one example, the vehicle may analyze the sensor data and/or the map data to determine an event associated with an agent (e.g., a cut-in event, a crosswalk event, etc.).

Block 308 illustrates determining a drive envelope. For example, as described herein, the drive envelope may represent a virtual portion of the environment in which the vehicle may travel relative to objects. FIG. 4 illustrates example actions for determining a drive envelope, and will be described in more detail, below.

Blocks 310, 212 and 314 may also be illustrative of actions carried out to determine the drive envelope at block 308. More specifically, block 310 illustrates determining whether to include each of the objects in a drive envelope. For example, based on the information of the objects, the vehicle may determine that certain objects are likely to have no impact on the vehicle, and thus may be excluded from the drive envelope, at block 310. For example, agents may be excluded based on their position relative to the vehicle 202, based on their velocity relative to that of the vehicle. In the specific example of FIG. 1, block 308 may determine that the pedestrian 106b should be excluded from determination of a drive envelope because of the pedestrian's 106b position and/or speed relative to the vehicle 102b. In additional examples, agents in front of the vehicle in the direction of travel may be excluded from consideration, for example, if it is determined that they are beyond a threshold distance, and/or have a relatively higher velocity.

In other examples, a predicted motion of the agents may be used to determine whether the agents are to be included or excluded. By way of non-limiting example, when it is determined that an agent in an adjacent lane is likely cut in front of the vehicle, that agent may be considered with additional processing, e.g., because its action could impact and/or potentially interfere with operation of the vehicle. In such example implementations, it may be desirable to consider the agent individually, including using higher order computations and processing. Similarly, maneuvers of the controlled vehicle may be considered when determining whether to include agents in the drive envelope determination. For example, when it is determined that a certain maneuver will require an action by an agent, e.g., the agent may need to change course or speed to allow the vehicle to maneuver, the agent may be excluded from the drive envelope determination. One example of such a maneuver may a lane change in which the agent may have to decelerate to make room for the vehicle. Because the maneuver requires some action on the part of the agent, the vehicle computing devices may monitor the agent more closely, rather than consider the agent solely via the drive envelope.

If it is determined at block 310 that an agent is not to be included, block 312 illustrates that such agents are excluded. Alternatively, block 314 illustrates determining a drive envelope using information of each agent determined to be included at block 310. As described herein, the drive envelope may be determined as a virtual space in the environment in which the vehicle can travel. The drive envelope may include boundaries that provide offsets from the agents, which may be determined based on semantic properties of the agent(s), probabilistic models (including models of the motion of agents, sensor measurements, and the like), or other information. In at least some examples, discrete portions (e.g. every 10 cm, 50 cm, 1 m, etc.) along the drive envelope boundaries may be encoded with additional information, such as, but not limited to, distance to the nearest agent, semantic classification of the nearest agent, uncertainties, confidences, etc. Moreover, in some implementations, more than one drive envelope may be determined. For example, much like real world drivers may have multiple options for avoiding an agent, e.g., pass on the right or pass on the left on a three-lane road, multiple drive envelopes may be determined for more than one potential planned path. In these examples, one drive envelope is selected for implementation. For example, a drive envelope may be preferred because it has a larger area, because it better conforms to traffic laws (e.g., pass a vehicle on the left instead of the right), because it avoids the most agents, or for one or more additional reasons. An example of determining a drive envelope is detailed further below in connection with FIG. 4.

As will be appreciated, as the vehicle moves through the environment, agents in the environment are ever-changing. Accordingly, the method 300 (and the method 400) may be carried out iteratively. For example, new drive envelopes may be determined in near real-time, e.g., at intervals of from about 0.5 seconds to about 3 seconds. Moreover, as agents change positions, velocities, attitudes, and the like, relative to the vehicle, agents previously excluded from the drive envelope determination may be included and agents previously included may be excluded. Moreover, each drive envelope may be based on a propagation of predicted motion, e.g., of the vehicle and/or of the agent(s). Thus, for example, the position along the path at which the lateral distances are determined may include an approximation of where agents will be when the vehicle is at the position.

Block 316 illustrates determining one or more drive trajectories in the drive envelope. For example, the planning system 226 can determine one or more trajectories for navigating the vehicle 202 within the drive envelope (e.g. by performing path planning (e.g. A*, RRT*, Dijkstra's algorithm, in addition to/or alternatively to, non-linear least square optimizations over a trajectory, etc.), while using the boundaries of the drive envelope and/or any encoded information therein as constraints. For instance, as in the example of FIG. 1, the prediction data may indicate that an agent in front of the vehicle 202 is slowing down. In response, the planning system 226 can determine a trajectory in the drive envelope that causes the vehicle 202 to change lanes in response to the slowing vehicle. In this manner, the vehicle 202 can avoid waiting for the vehicle to clear the current lane. Other trajectories are contemplated herein, and these examples are not intended to be limiting.

Block 318 illustrates executing the trajectory. As described above, the vehicle computing device(s) 204 can include one or more system controllers 230, which can be configured to control steering, propulsion, braking, safety, emitters, communication, and other systems of the vehicle 202. These system controller(s) 230 can communicate with and/or control corresponding systems of the drive module(s) 214 and/or other components of the vehicle 202. In at least one example, the system controller(s) 228 can receive the trajectory and can communicate with and/or control corresponding systems of the drive module(s) 214 and/or other components of the vehicle 202 such to cause the vehicle 202 to navigate along the trajectory in the drive envelope.

FIG. 4 is a flowchart illustrating an example method 400 for determining a drive envelope, as described herein. For example, the method 400 may generally correspond to block 308 and/or block 314 in FIG. 3, although blocks 308 and/or 314 are not limited to the example method 400, and the method 400 is not limited to inclusion in the method 300.

Block 402 illustrates determining a planned path through the environment. For example, scene 404 is provided proximate block 402 to illustrate the environment 100 from FIG. 1 (for clarity, most reference numerals are omitted from FIG. 4). The scene 404 is provided merely as an example implementation of techniques described herein. Other situations will vary, depending upon the environment, agents in the environment, predicted actions of those agents, or the like. In the scene 404, two vehicles 104a, 104b, and two pedestrians 106a, 106b are determined to be in the environment. Based on the relative position, relative motion, and/or other information, the planning system 226 can determine a planned path 406 along which it is predicted that the vehicle 102 can traverse. For example, the planned path 406 may be a path that is offset a minimum distance relative to agents in the environment (e.g., the agents determined to be included in the drive envelope calculation at 308 in method 300), is centered relative to lanes of the road, is offset relative to road markings, is determined based on other features, e.g., traffic rules, road signs, or the like. In some examples, the planned path 406 is not a path along which the vehicle is intended to travel, although it may be determined using many of the same systems that determine an actual drive path through the environment, e.g., the planning system 226, the prediction system 224, or the like. Although only the single planned path 406 is illustrated in the scene 404, the planned path 406 may be selected from a plurality of planned paths. For example, multiple planned paths may be determined by the planning system 226, with the planned path 406 being chosen from the multiple paths. In implementations, the planned path 406 may be chosen based on its proximity to agents, e.g., a path that travels closer to more agents may be disfavored relative to a path that travels closer to fewer agents. In other implementations, a shorter path may be favored over a longer path. Other criteria may also or alternatively be used to make the final determination.

Block 408 illustrates determining one or more attributes associated with each of a plurality of objects in the environment. For example, as described herein, the plurality of objects for which attributes are associated may be the objects determined to be included the drive envelope, e.g., at block 308 of the method of FIG. 3. The attributes may include and/or overlap with the information used in the method 308 to determine whether to include the objects in the drive envelope determination. For example, current attributes of the agents may include the agent's semantic classification, pose, position (e.g., in a local or global coordinate system and/or relative to the vehicle), extent, heading, velocity, and/or acceleration, in addition to any uncertainty associated with any one or more attributes. For example, the attributes may be determined based on the sensor data about the object and/or using one or more of the planner system, the prediction system, or the like.

In example implementations, the attributes may include semantic information associated with the agent(s). For instance, based on the sensor data, the vehicle computing device(s) 204, e.g., the localization system 220 and/or the perception system 222 may classify each of the objects, e.g., as a vehicle, a person, a specific animal, a traffic sign, or the like. Moreover, the semantic information may also include further sub-classifications. For example, a vehicle may be classified as a moving vehicle or a parked vehicle. The agent information may also include probabilistic and/or uncertainty information associated with the agent (e.g. with respect to position, velocity, acceleration, semantic classification, etc). In some implementations, the prediction system 228 may determine a predicted likelihood of a course of action by an agent. For example, in the scene 404, the likelihood that the vehicle 104b moves from its position may approach zero, for example, if there is no driver in the vehicle 104b. Similarly, the likelihood that the pedestrian 106b continues on a trajectory on the shoulder of the road, substantially parallel to the road, may be determined based on empirical data stored as agent information in the agent database 232.

Block 410 illustrates determining, for each of multiple positions on the planned path, a first distance between the respective position and one or more objects lateral to that position. Scene 412 is a portion of the scene 404 and illustrates the processing of block 410. Specifically, a distance 414 is shown as a distance between the planned path 406 and the pedestrian 106a, a distance 416 is shown as a distance between the planned path and the moving vehicle 104a, and a distance 418 is shown as a distance between the planned path and the stationary vehicle 104b. A lateral distance to the pedestrian 106b is not determined because the pedestrian 106b is not to be included in the drive envelope calculation. For example, because of the relative speed of the vehicle 102, the pedestrian 106b, even if making a drastic maneuver such as running out into the road would not impact the vehicle 102. The lateral distances 414, 416, 418 may be perpendicular to a segment of the planned path 406 proximate each position. Thus, although not illustrated, the lateral distances along the path 406 when the path is crossing between lanes would be oblique relative to the direction of travel. Stated differently, each of the lateral distances may be measured along a lateral axis of a vehicle at a plurality of discrete poses the vehicle would have while travelling along the planned path 406. Moreover, consideration of each of the discrete poses may also include a propagation of the agents in the environment. Thus, for example, considering an advanced position 5 meters along the planned path may also include a prediction of where each of the agents will be when the vehicle has advanced that 5 meters. In implementations, the lateral dimensions may be determined using image processing techniques, including ray casting.

As part of block 410, the lateral dimensions may be determined for any number of positions along the projected path. For example, the lateral dimensions may be determined for discrete points every 10 cm to 100 cm along the planned path. Information from these discrete points may then be interpolated to create the drive envelope. Moreover, although the discrete points may be evenly spaced, in other implementations the discretization may be adaptive. For example, for relatively (laterally) closer agents, the frequency of points considered may be increased (e.g., more points per unit distance may be considered). Moreover, the points may be determined based on features of the agents. For example, points at a corner, leading edge, and/or trailing edge of an agent may be used to determine the drive envelope according to implementations of this disclosure. As also illustrated, there are portion of the planned path 406 at which no agents are laterally disposed. In these implementations, the lateral distances may be measured to other physical objects, including but not limited to road signs, road markings, curbs, and the like. In some implementations, map data may also be used to augment the sensor data, e.g., to determine a lateral extent of a road surface when no object is detected in that direction. Additionally, or alternatively, such objects may be propagated in time (e.g. according to a probabilistic model) such that future features (positions, velocities, uncertainties, semantic classifications, and corresponding uncertainties) of the objects (agents) are incorporated into the drive envelope as well.

Block 420 illustrates determining a second distance for each of the positions, based on the attributes determined at block 408 and the first distances determined at block 410. For example, a distance 422, less than the distance 414, may be determined for the pedestrian 106a, a distance 424, less than the distance 416 may be determined for the moving vehicle 104a, and a distance 426, less than the distance 418, may be determined for the stationary vehicle 104b. In examples of this disclosure, the distances 422, 424, 426 may be based on semantic information. For example, different classifications of objects may have different associated safety factors, and minimum offsets may be associated with those safety factors. By way of non-limiting example, pedestrians may have a first safety factor associated therewith, and a minimum distance the vehicle should maintain may be a relatively large distance, e.g., on the order of about 0.5 to about 0.8 meters. Additional safety factors may be associated with other agents. For example, a minimum distance of 0.1 m or less may be associated with a stationary, inanimate object, such as parked car, a construction cone, or road sign. Moreover, within classes of agents, different safety factors may be applicable. In other implementations, these "minimum" distances may be preferred distances, with vehicle being able to determine costs associated with going below those minimum distances.

The distances 422, 424, 426 may also be determined based on probabilistic information. For example, inasmuch as the lateral distances 414, 416, 418 are determined using mathematical techniques, there will be some uncertainty in those calculated distances. Moreover, uncertainty associated with the sensors providing the sensor data and with the prediction models may also be considered when determining the distances 422, 424, 426. In one example implementation, for example, each of the distances 414, 416, 418 may be determined based on a Gaussian distribution. Moreover, the covariance of that distribution may provide filtering that allows for further determination of the adjusted distances 422, 424, 426. In various examples, the lateral distances, semantic classifications, object features, and corresponding uncertainties associated with discrete lengths along the drive envelope may be encoded into the boundaries for use in trajectory generation and optimization (e.g. as a cost or constraint for path planning as described in detail above).

Block 428 illustrates determining a drive envelope having lateral distances equal to the second distances at each position. For example, the second distances 422, 424, 426 determined for each of the positions are fused together into a single drive envelope 430 in which the vehicle can travel through the environment. As will be appreciated, the drive envelope will have varied lateral extents to accommodate for different agents. As illustrated, the drive envelope may determine a relatively larger offset for the pedestrian 106b than for either the moving vehicle 104a or the stationary vehicle 104b. Similarly, the lateral offset relative to the moving vehicle 104a may be larger than for the stationary vehicle 104b. For points along the projected path for which there is no laterally-disposed agent, the second distance may be calculated as a standard offset, e.g., 0.1 meter, from a lane marking and/or some other static feature in the environment.

The various techniques described herein can be implemented in the context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures can be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software can be stored and distributed in various ways and using different means, and the particular software storage and execution configurations described above can be varied in many different ways. Thus, software implementing the techniques described above can be distributed on various types of computer-readable media, not limited to the forms of memory that are specifically described.

Example Clauses

A: An example vehicle includes: one or more sensors disposed on the vehicle; one or more processors; and memory storing processor-executable instructions that, when executed by the one or more processors, configure the vehicle to: receive sensor data from a sensor of the one or more sensors, the sensor data comprising information about an object in an environment proximate the vehicle; determine a planned path of the vehicle through the environment; determine a lateral distance between the planned path and the object; determine a classification of the object; determine, based at least in part on the lateral distance and the classification, a width; and determine a drive envelope, wherein the drive envelope defines a boundary of a portion of the environment along the planned path in which the vehicle can travel and wherein at least a portion of the envelope extends the width laterally from the planned path and toward the object.

B: The vehicle of example A, wherein the classification comprises a static object or a lane boundary and wherein the instructions, when executed by the one or more processors, further configure the vehicle to: determine, based on the classification, a minimum distance to maintain between the vehicle and the object, and a difference between the lateral distance and the width is based at least in part on the minimum distance.

C: The vehicle of example A or example B, wherein the classification comprises a car, a bicycle, a motorcycle or a pedestrian, and wherein the instructions, when executed by the one or more processors, further configure the vehicle to determine an uncertainty associated with movement of the object or the sensor, wherein the width is based at least in part on the uncertainty.

D: The vehicle of any one of example A through example C, wherein the instructions, when executed by the one or more processors, further configure the vehicle to: determine, based at least in part on the drive envelope, a trajectory, the trajectory defining motion of the vehicle in the environment and within the drive envelope; and control the vehicle to travel through the environment according to the trajectory.

E: An example method includes: determining a planned path of a vehicle through an environment, the planned path beginning at an origin and ending at a destination; detecting, based at least in part on sensor data acquired from a sensor on the vehicle, an object in the environment; determining a plurality of points along the planned path; determining lateral distances from each of the plurality of points to the object; determining a classification of the object; determining, based at least in part on the lateral distances and the classification, one or more widths; and determining, based at least in part on the one or more widths, a drive envelope through the environment, the drive envelope comprising a portion of the environment along the planned path in which the vehicle can travel.

F: The method of example E, further comprising: determining, based on the classification, a minimum distance to maintain between the vehicle and the object, wherein determining the one or more widths comprises: determining that a differences between the lateral distances and the minimum distance do not meet or exceed a lane width; and determining, as the one or more widths, the differences.

G: The method of example E or example F, wherein the classification comprises a car, a bicycle, a motorcycle or a pedestrian, the method further comprising: determining a plurality of uncertainties associated with a movement of the object in the environment or the sensor; and associating the plurality of uncertainties with the plurality of points; wherein the plurality of widths is based at least in part on the plurality of uncertainties.

H: The method of any one of example E through example G, wherein the plurality of uncertainties is based at least in part on a covariance of a probability function associated with the object.

I: The method of any one of example E through example H, further comprising: determining a predicted movement of the object; and determining a probability associated with the predicted movement, wherein the determining the drive envelope is based at least in part on the probability associated with the predicted movement.

J: The method of any one of example E through example I, wherein the plurality of points are associated with the classification, a plurality of distances to the object, or a plurality of uncertainties.

K: The method of any one of example E through example J, wherein the plurality of uncertainties are associated with movement of the object, and wherein determining the plurality of uncertainties comprises propagating a probabilistic model of the object in time.

L: The method of any one of example E through example K, further comprising: determining, in accordance with a receding horizon technique and based at least in part drive envelope, a plurality of trajectories, the plurality of trajectories associated with a plurality of confidence levels; selecting, as a preferred trajectory, a trajectory of the plurality of trajectories associated with a highest confidence level; and controlling the vehicle to travel through the environment along the preferred trajectory and within the drive envelope.

M: The method of any one of example E through example L, wherein determining the plurality of trajectories comprises a non-linear least squares optimization or differential dynamic programming using the information encoded in the drive envelope as a cost.

N: An example non-transitory computer-readable medium having a set of instructions that, when executed, cause one or more processors to perform operations comprising: receiving sensor data from a sensor, the sensor data comprising information about an object in an environment of the vehicle; determining a planned path of the vehicle through the environment, the planned path comprising a path for the vehicle to traverse from an origin to a destination; determining, based at least in part on the sensor data, a distance between a first position on the planned path and the object, the distance being measured in a direction perpendicular to the planned path at the first position; determining a classification of the object; determining, based at least in part on the distance and the classification, a width; and determining a drive envelope in the environment, the drive envelope comprising a surface of the environment along the planned path on which the vehicle can travel without colliding with the object, a portion of the envelope extending the width laterally from the planned path at the first position and toward the first object.

O: The non-transitory computer-readable medium of example N, the operations further comprising: determining an uncertainty associated with a position of the object, a velocity of the object, or an acceleration of the object; determining, based at least on the width and the uncertainty, a trajectory; and controlling the vehicle to travel through the environment along the trajectory.

P: The non-transitory computer-readable medium of example N or example O, wherein the planned path is a first planned path and the drive envelope is a first drive envelope, the operations further comprising: determining a second planned path different from the first planned path; determining a second drive envelope comprising a second surface of the environment along the second planned path on which the vehicle can travel without colliding with the object; selecting one of the first drive envelope or the second drive envelope as the preferred drive envelope; determining, based at least in part on the preferred drive envelope, a trajectory, the trajectory defining a discrete motion of the vehicle in the environment and within the preferred drive envelope; and controlling the vehicle to travel through the environment along the trajectory.

Q: The non-transitory computer-readable medium of any one of example N through example P, wherein the classification comprises a car, a pedestrian, or a bicycle, the method further comprising: determining, based on the classification, a safety margin.

R: The non-transitory computer-readable medium of any one of example N through example Q, the operations further comprising: determining a difference between the distance and the safety margin; and determining that the difference does not meet or exceed a lane width associated with the first position; and determining, as the width, the difference.

S: The non-transitory computer-readable medium of any one of example N through example R, the operations further comprising: determining information associated with movement of the object, the information comprising predicted future locations of the object and uncertainties associated with the predicted future locations, wherein determining the width is based at least in part on the predicted future locations of the object and the uncertainties.

T: The non-transitory computer-readable medium of any one of example N through example S, wherein determining the drive envelope comprises determining, for additional positions along the planned path, additional widths for the drive envelope, the additional widths being based at least in part on a movement of the object or a probability associated with the movement.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations described herein need not be performed in the order disclosed, and other examples using alternative orderings of the computations could be readily implemented. In addition to being reordered, in some instances, the computations could also be decomposed into sub-computations with the same results.

What is claimed is:

1. A method comprising:
one or more of determining or receiving a region of an environment through which a vehicle is to travel along a reference path;
detecting, based at least in part on sensor data acquired from a sensor associated with the vehicle, an object in the environment;
determining, based at least in part on an attribute associated with the object, a width extending laterally from a first point along the reference path to a position proximate the object; and
determining, based at least in part on the width, a drive envelope through the environment, the drive envelope comprising a portion of the region on which the vehicle is to travel, the drive envelope extending the width laterally from the first point along the reference path and extending a second width laterally from a second point along the reference path.

2. The method of claim 1, further comprising:
determining, based on the attribute, a minimum distance to maintain between the vehicle and the object,
wherein determining the width comprises:
determining that a difference between the lateral distance and the minimum distance does not meet or exceed a lane width; and
determining, as the width, the difference.

3. The method of claim 1, further comprising:
determining one or more uncertainties associated with a movement of the object in the environment or with the sensor
wherein the determining the width is based at least in part on the one or more uncertainties.

4. The method of claim 3, wherein the one or more uncertainties is based at least in part on a covariance associated with the object.

5. The method of claim 3, wherein the one or more uncertainties are associated with movement of the object, and
wherein determining the one or more uncertainties comprises propagating a probabilistic model of the object in time.

6. The method of claim 1, further comprising:
determining a predicted movement of the object; and
determining a probability associated with the predicted movement,
wherein the determining the drive envelope is based at least in part on the probability associated with the predicted movement.

7. The method of claim 1, further comprising:
determining a plurality of points along the reference path including the first point and the second point; and
determining additional widths extending laterally from additional points of the plurality of points, the drive envelope being further based at least in part on the additional widths.

8. The method of claim 1, further comprising:
determining, in accordance with a receding horizon technique and based at least in part the drive envelope, a plurality of trajectories, the plurality of trajectories associated with a plurality of confidence levels;
determining, as a preferred trajectory and based at least in part on a non-linear least squares optimization or differential dynamic programming, a trajectory of the plurality of trajectories associated with a highest confidence level; and
controlling the vehicle to travel through the environment along the preferred trajectory and within the drive envelope.

9. A vehicle comprising:
a sensor;
one or more processors; and
memory storing processor-executable instructions that, when executed by the one or more processors, cause the one or more processors to perform actions comprising:
one or more of determining or receiving a region of an environment through which the vehicle is to travel along a reference path;
detecting, based at least in part on sensor data acquired from the sensor, an object in the environment;
determining, based at least in part on an attribute of the object, a distance extending laterally from a first point along the reference path proximate the object;
determining a drive envelope through the region of the environment, the drive envelope comprising a first width, based at least in part on the distance, at the first point along the reference path and a second width at a second point along the reference path; and
controlling the vehicle to travel through the region of the environment in the drive envelope.

10. The vehicle of claim 9, the actions further comprising:
determining, based on the attribute, a minimum distance to maintain between the vehicle and the object,
wherein determining the distance comprises:
determining that a difference between the distance and the minimum distance do not meet or exceed a lane width; and
determining, as the distance, the difference.

11. The vehicle of claim 9, the actions further comprising:
determining the reference path through the region of the environment, the reference path being based at least in part on a current location of the vehicle and a destination of the vehicle.

12. The vehicle of claim 9, the actions further comprising:
determining a plurality of points along the reference path including the first point and the second point; and
determining additional distances extending laterally from additional points of the plurality of points, the drive envelope being further based at least in part on the additional distances.

13. The vehicle of claim 12, the actions further comprising:
determining a plurality of uncertainties associated with a movement of the object in the environment of the sensor; and
associating the plurality of uncertainties with the plurality of points,
wherein the distance is based at least in part on the plurality of uncertainties.

14. The vehicle of claim 9, the actions further comprising:
determining a predicted movement of the object; and
determining a probability associated with the predicted movement,
wherein the determining the drive envelope is based at least in part on the probability associated with the predicted movement.

15. The vehicle of claim 9, wherein the controlling the vehicle comprises:
determining, in accordance with a receding horizon technique and based at least in part the drive envelope, a plurality of trajectories, the plurality of trajectories associated with a plurality of confidence levels;
selecting, as a preferred trajectory, a trajectory of the plurality of trajectories associated with a highest confidence level; and
controlling the vehicle to travel through the environment along the preferred trajectory and within the drive envelope.

16. A non-transitory computer-readable medium having a set of instructions that, when executed, cause one or more processors to perform operations comprising:
one or more of determining or receiving a region of an environment through which a vehicle is to travel along a reference path;
receiving sensor data from a sensor associated with the vehicle, the sensor data comprising information about an object in the environment;
determining, based at least in part on an attribute of the object, a distance extending laterally from a first point on the reference path proximate the object; and
determining a drive envelope through the environment, the drive envelope having a first width at the first point based at least in part on the distance and having a second width at a second point on the reference path.

17. The non-transitory computer-readable medium of claim 16, the operations further comprising:
determining, based on the one or more attributes, a minimum distance to maintain between the vehicle and the object,
wherein determining the distance comprises:
determining that a difference between the distance and the minimum distance do not meet or exceed a lane width; and
determining, as the distance, the difference.

18. The non-transitory computer-readable medium of claim 16, the operations further comprising:
determining a predicted movement of the object; and
determining a probability associated with the predicted movement,
wherein the determining the distance is based at least in part on the probability associated with the predicted movement.

19. The non-transitory computer-readable medium of claim 16, the operations further comprising:
determining a plurality of points along the reference path including the first point and the second point; and
determining additional distances extending laterally from additional points of the plurality of points, the drive envelope being further based at least in part on the additional distances.

20. The non-transitory computer-readable medium of claim 16, the operations further comprising:
determining an uncertainty associated with a position of the object, a velocity of the object, or an acceleration of the object;
determining, based at least on the distance and the uncertainty, a trajectory in the drive envelope; and
controlling the vehicle to travel through the environment along the trajectory.

* * * * *